United States Patent [19]

Guidarelli

[11] Patent Number: 5,142,855

[45] Date of Patent: Sep. 1, 1992

[54] PUSH OR PULL LEAF RAKE

[76] Inventor: Joseph A. Guidarelli, 2703 Myrtle Ave., Schenectady, N.Y. 12306

[21] Appl. No.: 680,931

[22] Filed: Apr. 5, 1991

[51] Int. Cl.⁵ .............................................. A01D 7/06
[52] U.S. Cl. ............................. 56/400.16; 56/400.06; 56/400.21
[58] Field of Search ........... 56/400.16, 400.17, 400.21, 56/400.04, 400.05, 400.06

[56] References Cited

U.S. PATENT DOCUMENTS

| | | | |
|---|---|---|---|
| 1,800,103 | 4/1931 | Pihl | 56/400.16 |
| 2,033,451 | 3/1936 | Rose | 56/400.16 |
| 2,637,261 | 5/1953 | Wale | 56/400.06 |
| 4,644,740 | 2/1987 | Lee | 56/400.06 X |
| 4,901,801 | 2/1990 | Popivalo | 56/400.06 X |

Primary Examiner—Terry Lee Melius
Attorney, Agent, or Firm—Richard C. Litman

[57] ABSTRACT

Disclosed is a rake for raking leaves and other debris which is operable in either a pulling or pushing mode, depending upon the rotational position of the handle. The rake head has two sets of oppositely directed tines thereon, the tines and head having a generally S-shaped cross-section configuration, whereby the rake may be operated in either a pulling or pushing mode with equal ease. In a first embodiment the rake head and the at least two sets of oppositely directed tines have a rectangular configuration as seen from the front. In the second embodiment the rake head and the at least two sets of oppositely directed tines or teeth have a fan-shaped configuration.

7 Claims, 3 Drawing Sheets

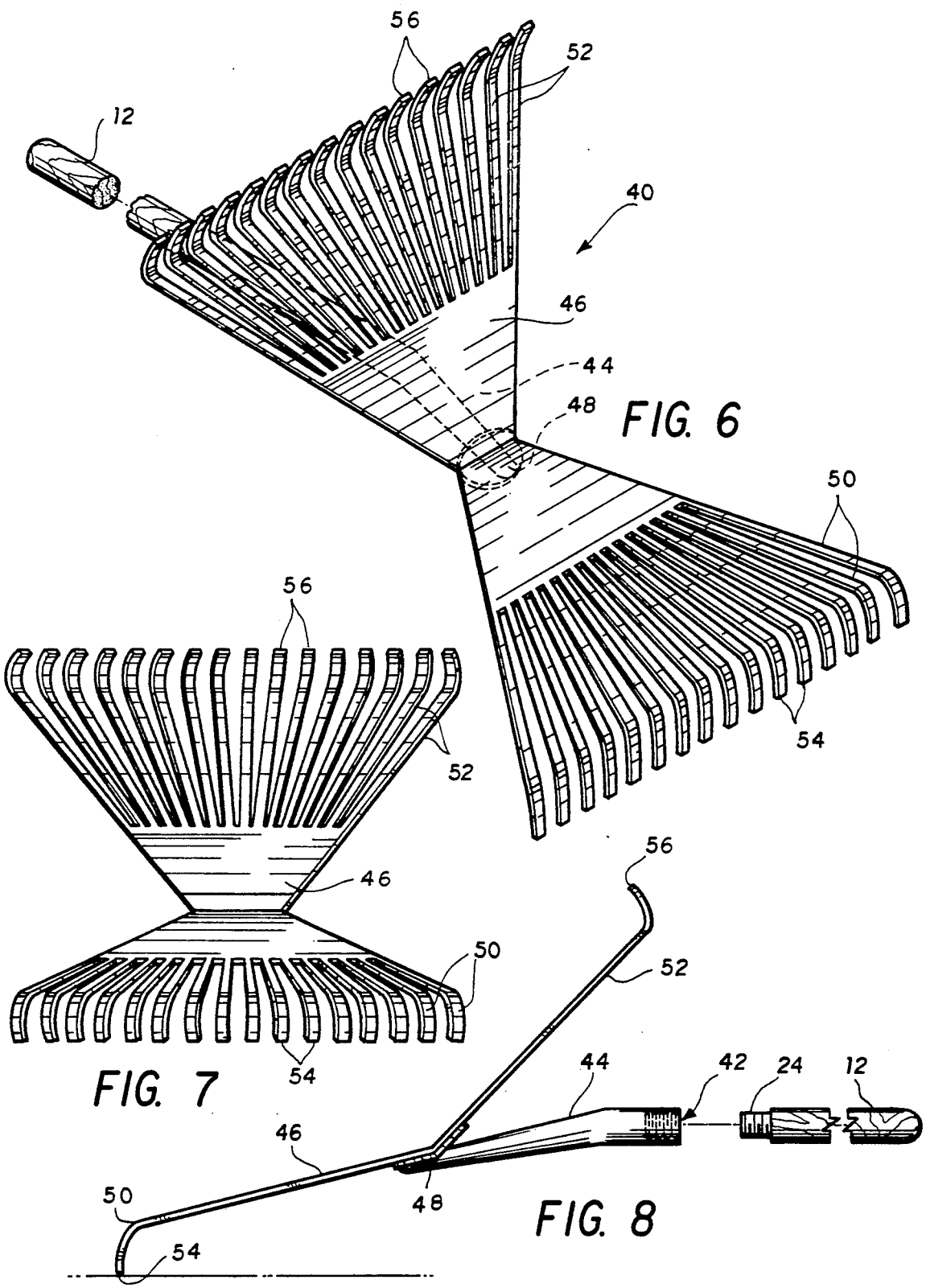

PUSH OR PULL LEAF RAKE

BACKGROUND OF THE INVENTION

1. Field of the Invention

This invention relates to a rake for raking leaves and other loose debris, the rake being usable in either a pulling or pushing mode of operation.

Normally, a raking operation involves pulling the rake toward the user. There are occasions, however, when it may be desirable and easier to push the debris away from the user in a shoveling or brushing type of operation. This invention provides both modes of operation in the alternative, merely by rotating the handle 180 degrees whereby one of two sets of teeth are placed in position to either push or pull the leaves and other debris as desired.

2. Description of Related Prior Art

Rakes having two sets of teeth are well known. U.S. Pat. No. 1,601,745 issued to George A. Swineford and Homer S. Lerch on Oct. 5, 1926, U.S. Pat. No. 2,705,394 issued to Sverre Johan Steensen on Apr. 5, 1955, U.S. Pat. No. 3,735,574 issued to William C. R. Heckner on May 29, 1973, and U.S. Pat. No. 4,791,780 issued to David X. Phillips on Dec. 20, 1988 are representative examples of rakes having two sets of teeth. Each of the above-identified rakes are designed to be pulled towards the user regardless of the set of teeth selected to be operative.

U.S. Pat. No. 1,239,735 issued to Chaucey W. Smith and Clarence M. Lamb on Sep. 11, 1917 discloses a rake designed to be operative by pulling or pushing, with only one set of teeth. U.S. Pat. No. 4,644,740 issued to Ung L. Lee on Feb. 24, 1987 discloses a reversible rake which may be pushed along the ground on a bearing member or reversed and used in a more conventional pulling mode. The tines or teeth are disclosed to have bent ends which are used in the pushing mode, while the opposite ends are straight, designed to be used in a pulling mode. As an alternative embodiment (see FIG. 8), Lee substitutes a scraper member for the portion of the tines used for the pushing mode.

SUMMARY AND OBJECTS OF THE INVENTION

It is an object of this invention to provide a rake which may be used in either a pushing mode or a pulling mode of operation.

It is a further object of this invention to provide a rake having two sets of teeth configured to allow either a pushing or a pulling mode of operation.

It is still another object of this invention to form the rake tines of each set as integral members molded of plastic, preferably nylon.

It is still another object of this invention to form the rake tines of each set as individual S-shaped tines mounted on a supporting rod, whereby a rake may be operative in each of two directions.

The above objects are achieved by either molding or forming the tines of either plastic material such as nylon or metal, such as spring steel, the tines having substantially an S-shaped configuration, with the opposite ends bent in opposite directions to form two sets of teeth. The tines may be molded to be integral with the supporting structure, or may be individually mounted on a supporting bar. The user need only rotate the handle 180 degrees to select one or the other of the two sets of tines to be used.

Other objects, features and advantages of this invention will be apparent from the following detailed description and the appended claims, reference being had to the accompanying drawings forming a part of the specification, wherein like reference numerals designate corresponding parts of the several views.

BRIEF DESCRIPTION OF THE DRAWINGS

FIG. 6 is a perspective view of a second embodiment of a push or pull rake having two sets of opposing teeth or tines, each set being configured to have a fan shape.

FIG. 7 is a front view of the FIG. 6 embodiment showing the fan-like configuration of the opposing teeth or tines.

FIG. 8 is a side view of the FIG. 6 embodiment showing the rake in position to be pulled toward the user.

DETAILED DESCRIPTION OF THE PREFERRED EMBODIMENT

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Figure 1:
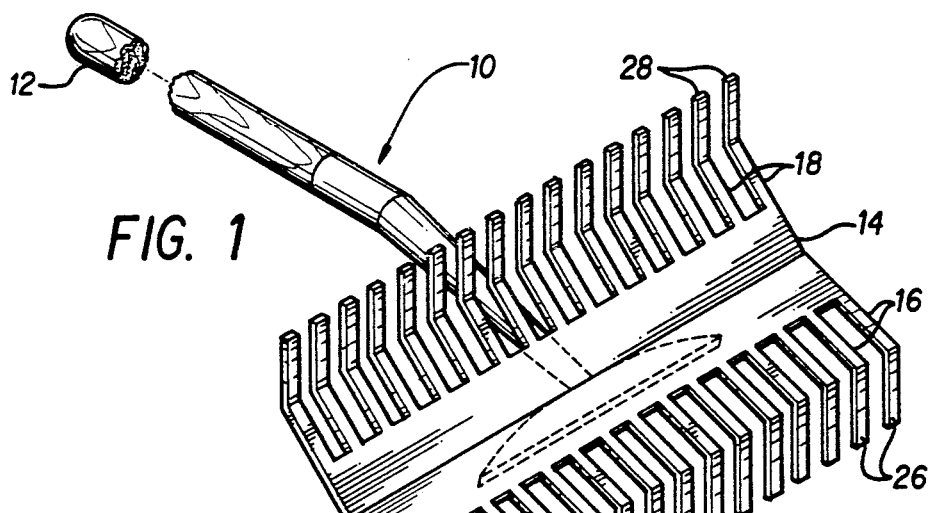
FIG. 1 is a perspective view of one preferred embodiment of a push or pull rake having two sets of opposing teeth or tines.

Turning to FIG. 1, there is shown a rake 10 which may be pulled toward the user or pushed from the user, depending upon the orientation of the rake handle 12. The rake head 14 which carries two opposing sets of tines or teeth 16 and 18 may be molded from plastic or formed of spring steel, and includes a socket 20 internally threaded as at 22 to receive the externally threaded end 24 of handle 12.

Figure 2:
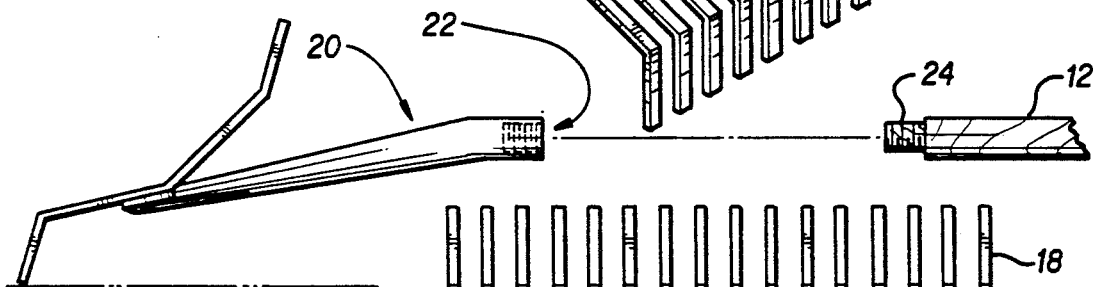
FIG. 2 is a side view of the rake of FIG. 1.
Figure 3:
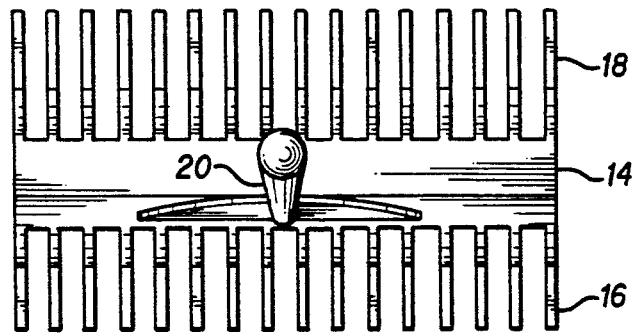
FIG. 3 is a rear view of the rake of FIG. 1.
Figure 4:
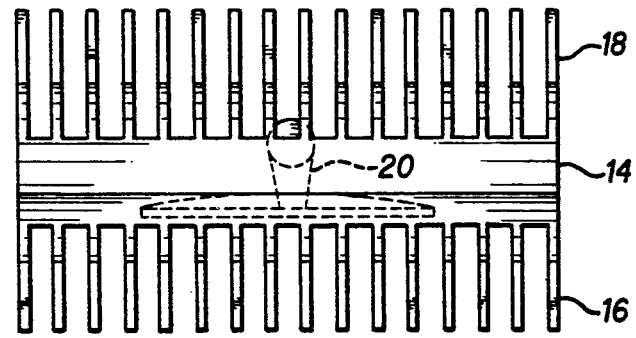
FIG. 4 is a front view of the rake of FIG. 1.

FIG. 2 provides a side view of rake 10 showing the orientation of rake head 14 relative to handle 12 and the configuration of tines 16 and 18. Socket 20 may be attached to rake head 14 in any suitable fashion, including being integrally molded therewith. As shown in FIGS. 1-5, inclusive, socket 20 has at its base an elongated bar portion 30 which is attached to rake head 14. Rake head 14 together with tines 16 and 18, have substantially an S-shaped configuration when viewed from the left side of FIG. 1, with the respective tine ends 26, 28 facing in opposite directions.

Figure 5:
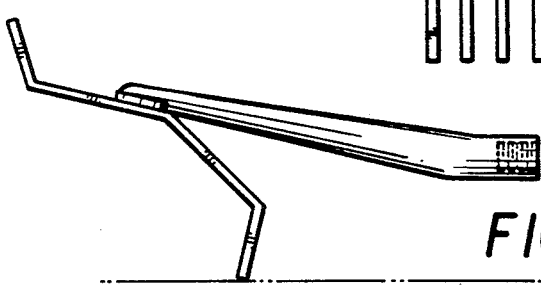
FIG. 5 is a side view similar to FIG. 2 showing the rake of FIG. 1 rotated 180° about the axis of the rake handle to position the rake tines for a pushing operation.

When rake head 14 is oriented as shown in FIGS. 1 and 2, tines 16 function as conventional rake tines with rake 10 being pulled towards the user. However, it may be desirable to use the rake as a push broom to push the leaves and other debris away from the user. Under such a circumstance, the user would merely rotate handle 12 by 180 degrees about its longitudinal axis so as to locate tines 18 on the ground, with tines 16 now standing substantially vertically upwardly and forward of the location of tines 18 as shown in FIG. 5. With this alternate orientation, rake 10 may now be pushed away from the user, with tines 18 functioning in the same manner as tines 16 to move leaves or other debris in an efficient way.

Figure 9:
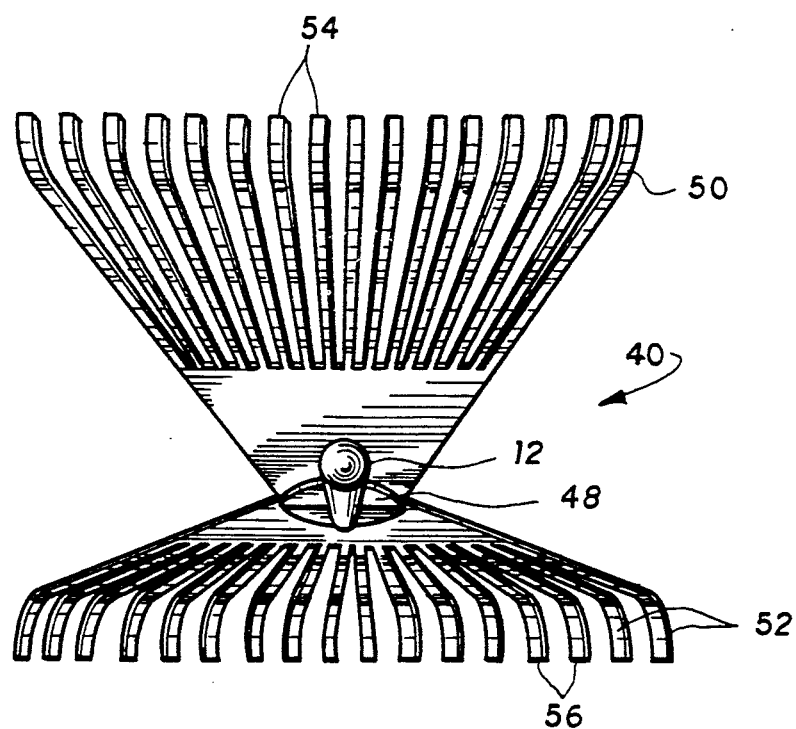
FIG. 9 is a rear view of the FIG. 6 embodiment.
Figure 10:
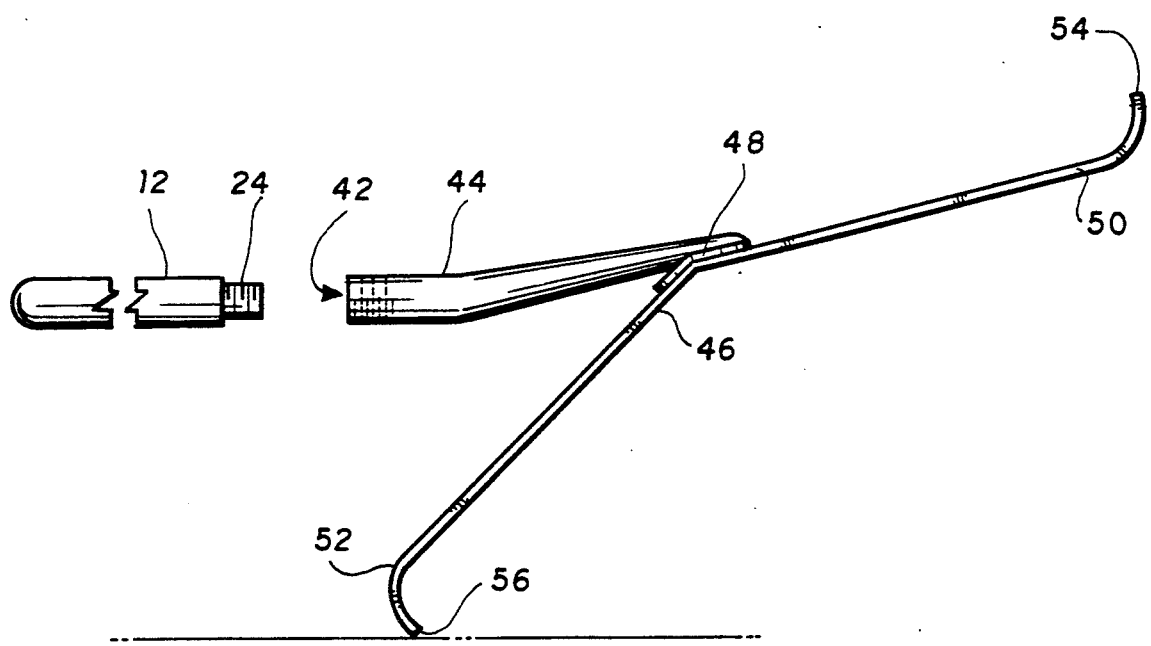
FIG. 10 is a side view of the FIG. 6 embodiment with the teeth or tines positioned to be pushed by the user.

In the embodiment shown in FIGS. 6-10, inclusive, rake 40 has a fan-shaped configuration. Handle 12 is the same as in the embodiment of FIGS. 1-5, inclusive, with threaded end 24 fitting into the internally threaded end 42 of socket 44 as shown in FIGS. 8 and 10. Socket 44 is suitably connected to rake head 46 by means of an elongated bar 48. Rake head 46 carries two opposing sets of tines or teeth 50 and 52. As in the first embodiment, rake head 46 and the two opposing sets of tines or teeth 50 and 52 may be molded from plastic or formed of spring steel, and have substantially an S-shaped configuration when viewed from the left side of FIG. 6, with the respective tine ends 54 and 56 facing in opposite directions.

When rake head 46 is oriented as shown in FIGS. 6 and 8, rake 40 functions as a conventional rake with handle 12 and tines 50 pulled towards the user as in the embodiment of FIGS. 1 and 2. When handle 12 is rotated 180 degrees about its longitudinal axis as shown in FIGS. 9 and 10, tines 52 are located to enable the user to push rake 40 away from the user in a pushing operation.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

I claim:

1. A reversible dual functioning rake means comprising:
   an elongated handle means having a first and a second end;
   a rake head means having at least two sets of opposing tine means attached thereto, one set of said two sets of opposing tine means being suitably located to enable pulling of the rake means toward a user, and a second set of said two sets of opposing tine means being suitably located to enable pushing of the rake means away from said user;
   said two sets of opposing tine means and said rake head means having a substantially S-shaped configuration in cross-section, each of said two sets of opposing tine means having tine ends, the tine ends of one of said two sets of opposing tine means facing in a direction opposite the direction of facing of the tine ends of the other of said two sets of opposing tine means; and
   a socket means suitably attached to said rake head means for receiving one of said first and second ends of said elongated handle means; whereby
   when said elongated handle means is oriented in a first position said one set of said two sets of opposing tine means is operative without further modification to enable pulling of the rake means towards the user, and when said handle means is rotated 180 degrees about the longitudinal axis thereof to a second position, the second set of said two sets of opposing tine means is operative without further modification to enable pushing of the rake means away from the user, the rake means being selectively pulled and pushed with equal ease.

2. A reversible dual functioning rake means as in claim 1, wherein the two sets of opposing tine means are integrally formed with said rake head means of plastic material.

3. A reversible dual functioning rake means as in claim 1, wherein the two sets of opposing tine means are integrally formed with said rake head means of spring steel.

4. A reversible dual functioning rake means as in claim 1, wherein:
   said socket means is internally threaded to receive mating external threads on said one of said first and second ends of said elongated handle means, whereby said elongated handle means is connected to said socket means.

5. A reversible dual functioning rake means as in claim 1, wherein:
   said socket means is attached to said rake head means by an elongated bar means.

6. A reversible dual functioning rake means as in claim 1, said rake head means and said at least two sets of opposing tine means having a fan-shaped configuration.

7. A reversible dual functioning rake means as in claim 1, said rake head means and said at least two sets of opposing tine means having a rectangular configuration.

* * * * *